United States Patent [19]

Zibell

[11] Patent Number: 4,863,745

[45] Date of Patent: Sep. 5, 1989

[54] CHEWING GUM CONTAINING ZEIN COATED HIGH-POTENCY SWEETENER AND METHOD

[75] Inventor: Steven E. Zibell, Palos Heights, Ill.

[73] Assignee: Wm. Wrigley Jr. Company, Chicago, Ill.

[21] Appl. No.: 134,948

[22] Filed: Dec. 18, 1987

Related U.S. Application Data

[63] Continuation-in-part of Ser. No. 921,754, Oct. 22, 1986.

[51] Int. Cl.⁴ .................................................. A23G 3/30
[52] U.S. Cl. ........................................ 426/5; 426/548;
426/804; 426/302; 426/303; 426/99
[58] Field of Search ............................ 426/3–6,
426/548, 804, 302, 303, 310, 321, 96

[56] References Cited

U.S. PATENT DOCUMENTS

| | | | |
|---|---|---|---|
| Re. 29,682 | 6/1978 | Cella et al. | 426/548 |
| 3,262,788 | 7/1966 | Swanson et al. | 99/199 |
| 3,753,739 | 8/1973 | Cella et al. | 99/141 |
| 3,922,354 | 11/1975 | Galluzzi et al. | 426/96 |
| 3,928,633 | 12/1975 | Shoaf et al. | 426/96 |
| 3,956,507 | 5/1976 | Shoaf et al. | 426/96 |
| 3,962,468 | 6/1976 | Pischke et al. | 426/96 |
| 4,004,039 | 1/1977 | Shoaf et al. | 426/548 |
| 4,059,706 | 11/1977 | Pischke et al. | 426/548 |
| 4,139,639 | 2/1979 | Bahoshy et al. | 426/3 |
| 4,230,687 | 10/1980 | Sair et al. | 424/22 |
| 4,384,004 | 5/1983 | Cea et al. | 426/3 |
| 4,384,005 | 5/1983 | McSweeney | 426/250 |
| 4,465,694 | 8/1984 | Okada | 426/3 |
| 4,495,213 | 1/1985 | Wolf et al. | 426/548 |
| 4,497,835 | 2/1985 | Winston | 426/72 |
| 4,517,214 | 5/1985 | Shoaf et al. | 426/548 |
| 4,554,167 | 11/1985 | Sorge et al. | 426/285 |
| 4,556,565 | 12/1985 | Arima et al. | 426/3 |
| 4,568,560 | 2/1986 | Schobel | 427/3 |
| 4,579,747 | 4/1986 | Sugiyama et al. | 426/548 |
| 4,597,970 | 7/1986 | Sharma et al. | 426/5 |
| 4,634,593 | 1/1987 | Stroz et al. | 426/5 |
| 4,704,228 | 11/1987 | Tsau et al. | 426/99 |

FOREIGN PATENT DOCUMENTS

| | | | |
|---|---|---|---|
| 675004 | 11/1963 | Canada | 426/285 |
| 86810619 | 7/1987 | European Pat. Off. . | |
| 87300375 | 7/1987 | European Pat. Off. . | |
| 87301903 | 9/1987 | European Pat. Off. . | |
| 59-95862 | 6/1984 | Japan . | |
| 58157509 | 3/1985 | Japan . | |
| 1274905 | 5/1972 | United Kingdom | 426/285 |
| 1301770 | 1/1973 | United Kingdom . | |

*Primary Examiner*—Jeanette Hunter
*Attorney, Agent, or Firm*—Willian Brinks Olds Hofer Gilson & Lione

[57] ABSTRACT

The present invention is a method for producing a chewing gum with a delayed release high-potency sweetener as well as the chewing gum so produced. The delayed release high-potency sweetener is obtained by mixing a quantity of previously coated high-potency sweetener particles with a limited quantity of a solution of zein. Preferably, the zein is dissolved in water with a pH between about 11.5 and about 12.1. The quantity of the zein solution being added is limited to thereby produce a damp mix which is characterized as being dust free, non-flowing, and crumbly. The damp mix is dried and then particle sized to thereby produce twice-coated particles of the high-potency sweetener within a predetermined particle size range. When incorporated into the chewing gum, these particles are adapted to enhance the shelf-stability of the sweetener and/or produce a delayed release when the gum is chewed.

55 Claims, 4 Drawing Sheets

(100 X)

(100 X)

4,863,745

CHEWING GUM CONTAINING ZEIN COATED HIGH-POTENCY SWEETENER AND METHOD

CROSS-REFERENCE TO RELATED APPLICATION

The present application is a continuation-in-part of U.S. patent application Ser. No. 921,754, filed Oct. 22, 1986 by the same inventor and assigned to the same assignee. The entire disclosure of this parent application is incorporated herein by reference.

BACKGROUND OF THE INVENTION

The present invention relates to methods for producing chewing gum. More particularly, the invention relates to methods for producing chewing gum containing high-potency sweeteners which have been treated to enhance shelf-life stability and/or controlled release.

In recent years, efforts have been devoted to controlling the release characteristics of various ingredients in chewing gum. Most notably, attempts have been made to delay the release of sweeteners and flavors in various chewing gum formulations to thereby lengthen the satisfactory chewing time of the gum. Delaying the release of sweeteners and flavors can also avoid an undesirable overpowering burst of sweetness or flavor during the initial chewing period. On the other hand, some ingredients have been treated so as to increase their rate of release in chewing gum.

In addition, other efforts have been directed at protecting high-potency sweeteners within the chewing gum formulation, to thereby increase the shelf-stability of the ingredient, i.e. the protection against degradation of the high-potency sweetener over time.

For example, U.S. Pat. No. 4,597,970 to Sharma et al., teaches a process for producing an agglomerated sweetener wherein the sweetener is dispersed in a hydrophobic matrix consisting essentially of lecithin, a glyceride, and a fatty acid or wax having a melting point between 25° and 100° C. The method disclosed uses a spray congealing step to form the sweetener-containing matrix into droplets followed by a fluid bed second coating on the agglomerated particles.

U.S. Pat. Nos. 4,515,769 and 4,386,106, both to Merrit et al., teach a two step process for preparing a delayed release flavorant for chewing gum. In this process, the flavorant is prepared in an emulsion with a hydrophyllic matrix. The emulsion is dried and ground and the particles are then coated with a water impermeable substance.

U.S. Pat. No. 4,230,687, to Sair et al., teaches a process for encasing an active ingredient to achieve gradual release of the ingredient in a product such as chewing gum. The method described involves adding the ingredient to an encapsulating material in the form of a viscous paste. High shear mixing is used to achieve a homogeneous dispersion of the ingredient within the matrix which is subsequently dried and ground.

U.S. Pat. No. 4,139,639, to Bahoshy et al., teaches a process of "fixing" aspartame by co-drying (by spray drying or fluid bed coating) a solution containing aspartame and an encapsulating agent, such as gum arabic, to thereby surround and protect the aspartame during storage in the gum.

U.S. Pat. No. 4,384,004, to Cea et al., teaches a method of encapsulating aspartame with various solutions of encapsulating agents using various encapsulation techniques such as spray drying in order to increase the shelf-stability of the aspartame.

U.S. Pat. No. 4,634,593 to Stroz et al., teaches a method for producing controlled release sweeteners for confections, such as chewing gum. The method taught therein involves the use of an insoluble fat material which is mix mulled with the sweetener.

Naturally, the processes which use spray drying or fluid bed techniques for encapsulating the ingredients involve a relatively large investment in equipment and require skilled operating personnel and sophisticated process controls.

SUMMARY OF THE INVENTION

The present invention is a method for producing a chewing gum with a twice-coated high-potency sweetener as well as the chewing gum so produced. The delayed release high-potency sweetener is obtained by mixing a quantity of coated high-potency sweetener particles with a limited quantity of a zein solution. The quantity of the zein solution being added is limited to thereby produce a damp mix which is characterized as being dust free, non-flowing, and crumbly. The damp mix is dried and then particle sized to thereby produce twice-coated particles of the high-potency sweetener within a predetermined particle size range. The particles are then added to a chewing gum formulation.

In accordance with a first preferred method of the present invention, the high-potency sweetener is aspartame. Also in this preferred embodiment, the zein is dissolved in water having a pH of between about 11.5 and about 12.1 and contains between about 13 and about 18 weight percent zein. This aqueous zein solution is added in an amount between about 30 and about 70 percent by weight of the aspartame to be treated. In other terms, the final zein coated aspartame is preferably between about 5 and about 25 weight percent zein. In this embodiment, the chewing gum made is a mint flavored gum with between about 0.1 and about 0.5 weight percent of the coated aspartame.

In accordance with a second preferred method of the present invention, the zein is dissolved in ethanol to between about 10 and about 50 percent by weight of the solution. This ethanol solution is added to the previously coated particles of aspartame in amount of between about 25 and about 75 of the damp mix. After drying and grinding, the twice-coated particles are between about 10 and about 35 percent by weight zein.

In accordance with a third preferred method of the present invention, aspartame is first coated with a coating material such as a modified cellulose compound by the same process as that described above. In particular, the aspartame and coating material and a limited quantity of solvent are blended to a damp mix, dried, and ground to make once coated aspartame particles. The once coated aspartame particles are then treated with a zein solution as described above to produce twice-coated particles with a zein coating on the outer surface. In this third preferred embodiment, the gum product is a cinnamon flavored gum and has the twice-coated aspartame present in an amount between about 0.1 and about 0.5.

One advantage of the present invention is that the coating of zein on the previously coated aspartame has been found to enhance the shelf-stability of aspartame in chewing gum, particularly in chewing gums that include an aldehyde containing flavor component. This stability is significant because aldehyde containing flavor components such as cinamaldehyde found in cinnamon oil have been known to react with the aspartame and thereby greatly reduce the shelf-stability of aspartame in such a gum. Applicant's experiments have shown that previously coated aspartame which is then coated with the zein solution has significantly improved the stability in a cinnamon flavored gum.

The first preferred embodiment, which uses an aqueous solution of zein, also offers the advantage that a zein coating can be applied to the high-potency sweetener in a chewing gum without resorting to the use of ethyl alcohol as the solvent. This reduces the cost of using zein. That is, when using zein in an aqueous solution as opposed to ethyl alcohol, there is no danger of explosion, fire, or toxic effects.

The present invention is also advantageous in that it provides a relatively simple and inexpensive method for treating high-potency sweeteners to produce a delayed release in chewing gum. In particular, the method of the present invention can be carried out in a relatively short time and using relatively simple and inexpensive equipment. It was a surprising result that this relatively simple and inexpensive process could produce coated high-potency sweeteners with enhanced shelf-stability characteristics similar to or better than ingredients treated by more complicated and expensive processes.

It was also surprising that the high pH zein solution could be used for coating particles of the high-potency sweetener aspartame. Although it is generally known that aspartame is unstable in environments with high pH values, it has been discovered that previously coated aspartame is not significantly degraded by exposure to the zein solutions with a pH between about 11.5 and 12.1.

Although the present invention may be carried out in a continuous process, it is also well suited for batch processing. This is particularly advantageous in view of the small quantities of the high-potency sweeteners typically used for chewing gum formulations.

It should be noted that the phrase "delayed release" as used in this application is intended to refer to a delayed release of the high-potency sweetener during chewing of the gum as well as the delayed, or prevented, release of the high-potency sweetener in the chewing gum during storage, i.e. protecting the ingredient from the other components of the chewing gum during storage. The phrase "shelf-stability" is intended to refer the resistance to degradation of the high-potency sweetener in the chewing gum over time.

It should also be noted that the phrases "solution of zein" and "zein solution" are used in this specification and appended claims is intended to refer to a mixture of zein and solvent wherein either the zein is completely dissolved, or wherein a major portion of the zein is dissolved and the remaining minor portion is suspended in the solvent.

It should be further noted that the phrase "coated particles" refers to particles of high potency sweeteners which have been at least partially coated by a coating material. This coating can be applied in the manner described below for the application of the zein coating, or can be applied by conventional techniques such as spray drying, fluid bed coating, and the like. Also, the phrase "twice-coated" refers to particles that have been coated at least once before, and then coated with zein by the process of the present invention.

These advantages of the present invention described above as well as others will become apparent from the following description which, when taken in conjunction with the accompanying figures, discloses presently preferred methods of the present invention.

DETAILED DESCRIPTION OF THE PREFERRED EMBODIMENTS

Figure 1:
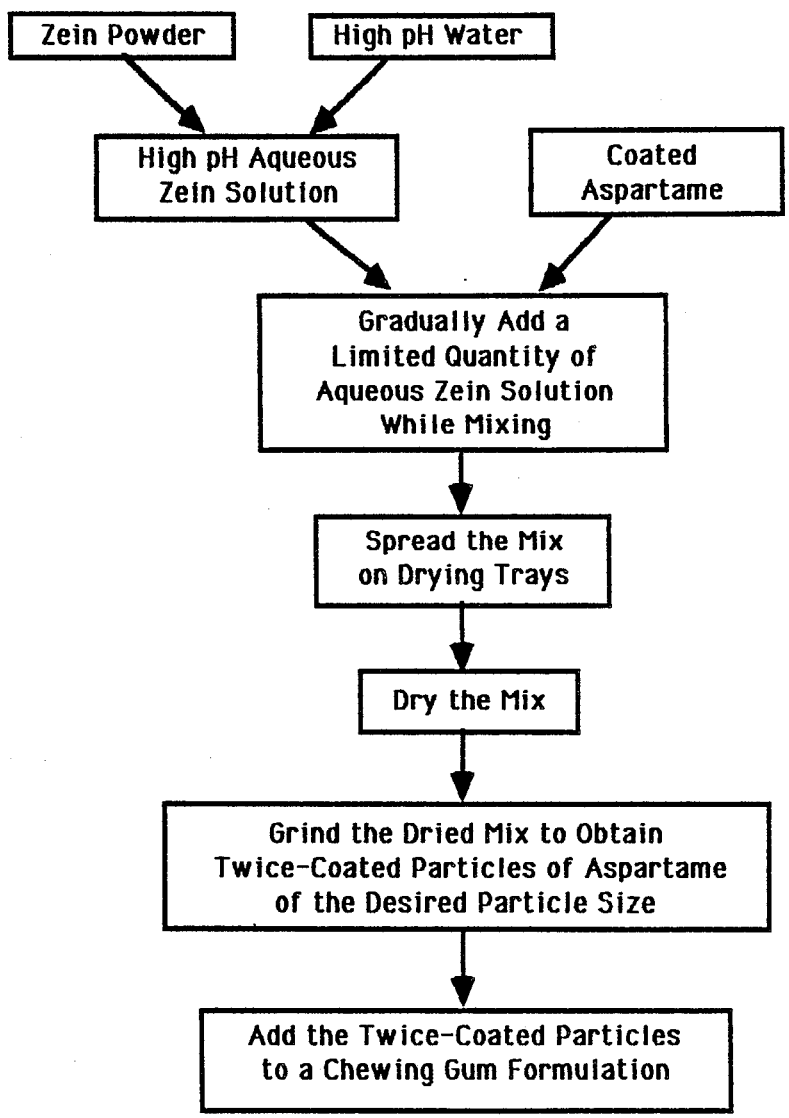
FIG. 1 is a schematic representation of a first preferred method of the present invention.

Referring to the drawings, FIG. 1 is a block diagram illustrating the steps in the process of a first preferred embodiment of the present invention. First, an aqueous solution of zein is prepared.

Zein is a protein of the prolamine class derived from corn. Typically, zein is obtained in a powdered form and is yellow, tasteless and is generally known to be insoluble in water and soluble in alcohols. In the most preferred embodiment, the zein is obtained from the Freeman Company.

Zein has been known in the past to be used as a coating material. However, in these uses, the zein was typically dissolved in ethyl alcohol. Naturally, the use of ethyl alcohol requires the installation of additional equipment to reduce the danger from explosions, fire, or toxic effects.

This first embodiment avoids these problems by using zein in an aqueous solution. An aqueous solution of zein is made possible by virtue of the fact that the aqueous solution is maintained at a relatively high pH, i.e. between about 11.5 and about 12.1. In this pH range, it has been found that the zein is significantly more soluble than in neutral water. Typically, when mixed with neutral water, zein powder will float on the top of the water without any appreciable solution, or even suspension of the zein within the water. Accordingly, it is not possible to coat particles with a solution of zein in neutral water.

In contrast, when mixed into water which has a pH between about 11.5 and 12.1, it is possible to get significant solution and suspension of zein particles within the water. In particular, it has been found that an aqueous solution of zein can be formed which contains up to 25 percent by weight zein. At this 25 percent level, the major portion of the zein is solvated with only a minor portion being suspended within the solution.

The aqueous solution of zein is prepared by adding the desired amount of zein to a quantity of water along with an amount of base sufficient to create a pH between about 11.5 and about 12.1. Preferably, sodium hydroxide is added to the water in sufficient quantity to create a pH between 11.6 and 11.9. It is preferred to add the zein and base simultaneously in increments while stirring. Alternatively, either the zein or the base can be added to the water before the other. Alternatively, other food acceptable bases can be used.

Generally, the aqueous zein solution should contain between about 1 and about 25 percent by weight zein. Preferably, the zein solution should have a zein content between about 5 and about 20 percent by weight. More preferably, the zein content will be between about 13 and about 18 percent by weight, most preferably about 16 percent by weight. As noted above, this zein content is higher than would be available without the high pH level of the water.

Referring again to FIG. 1, a quantity of previously coated high-potency sweetener particles is added to the bowl of a planetary type mixer. The high-potency sweetener can be selected from a variety of high-potency sweeteners, such as aspartame, alitame, acesulfame K, sucralose, saccharine and its salts, cyclamic acid and its salts, dihydrochalcones, thaumatin, and monellin, etc.

Most preferably the high-potency sweetener used in this invention is a dipeptide sweetener, such as aspartame or alitame. Most preferably, the dipeptide sweetener is aspartame, i.e. the methyl ester of L-aspartyl L-phenylalanine. The aspartame used in the most preferred embodiment, is obtained from the NUTRASWEET Company under their designation "NutraSweet ®." This is a powdered form with generally needle shaped crystals having a wide range of particle sizes.

Figure 4:
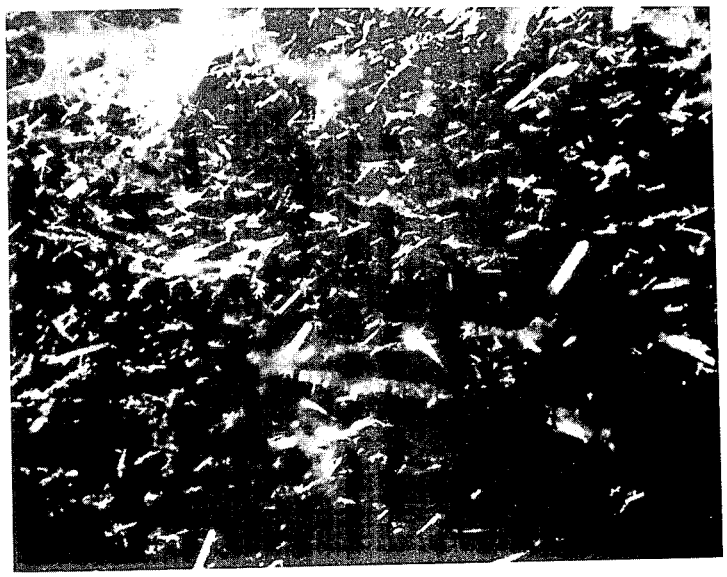
FIG. 4 is a photomicrograph of untreated aspartame crystals.

FIG. 4 is a photomicrograph at 100 × showing the form of the aspartame crystals before treatment by the present process. As can be seen, the crystals are relatively small and needle-like. Generally, this powder is considered difficult to work with because of its poor flowability and low bulk density. In particular, it is relatively difficult to coat these individual aspartame crystals because of their small size and needle-like shape.

In alternatively preferred embodiments, the dipeptide high-potency sweetener is L-aspartyl-D-alanine 2,2,4,4 tetramethyl-thienyl-amide, generally known as alitame.

In other alternatively preferred embodiments, the high-potency sweetener is the potassium salt of 6-methyl-1.2.3-oxathiazin-4(3H)-one-2.2-dioxide, generally known as acesulfame K.

The present invention also contemplates the simultaneous use of more than one high-potency sweetener. That is, two or more high-potency sweeteners may be mixed together before or during the present process. That is, it may be desirable to blend two different sweeteners in order to obtain the most desirable sweetness profile for the chewing gum. It is known in the art to combine high-potency sweeteners to mask undesirable aftertastes, and the like.

It is also contemplated within the present invention to combine a bulking agent with the high-potency sweetener before it is coated by the present process. This is particularly desirable when working with a high-potency sweetener such as thaumatin or monellin which have such a high sweetness per gram ratio.

It is further contemplated within the present invention to combine a flavoring agent with the high-potency sweetener at some point in the process. In this way, it is possible to produce twice-coated particles that will produce a delayed release of both a high-potency sweetener and a flavor when the gum is chewed.

As part of the method of the present invention, the particles of high-potency sweetener are coated in a step previous to being coated with zein. Several techniques exist by which the sweetener particles can be coated. The preferred method for producing the previously coated particles is that disclosed in U.S. patent application Ser. No. 921,754, from which the present application is a continuation-in-part, and which application has been incorporated herein by reference. Most preferably, the high-potency sweetener particles are aspartame particles coated with a modified cellulose compound as described in the most preferred embodiment of the parent application. This method is discussed in more detail in connection with FIG. 3.

The coated high-potency sweetener particles used in this method may also be coated by alternative techniques. Examples of such techniques include, but are not limited to, spray drying, spray chilling, and fluid bed coating. It is also within the scope of the present invention to use particles of high-potency sweetener which have been coated with more than one layer, or by more than one coating material.

Various coating materials may be used for the previously coated sweetener particles. The preferred coating material is a modified cellulose compound, most preferably hydroxypropyl methylcellulose.

Alternatively, the coating material can be selected from the following nonexclusive list: gums, shellac, zein, maltodextrins, gelatins, starches, and lactose, as well as combinations thereof.

Referring again to the preferred embodiment illustrated in FIG. 1, a limited amount of the zein solution is added to the previously coated high-potency sweetener in the mixing bowl. The amount of zein solution added will depend on the zein content of the solution and the desired amount of zein to be coated on the twice-coated high-potency sweetener at the conclusion of the process.

Also, the amount of zein solution is intentionally limited so as to produce a damp, dust-free, non-flowable, non-extrudable, crumbly mixture. By the word "crumbly" it is meant that the damp mix easily separates from itself. By way of comparison, the damp mix should have the consistency and texture of wet sand. By way of contrast, the damp mix should not have so much solution that it becomes dough-like, paste-like, clay-like, or soup-like. It has been found that, if the mix does go to the dough-like stage, many of the advantages of the present invention are lost. In particular, the dough-like mix is more difficult to mix, handle, and dry and considerably more difficult to achieve the desired particle sizes.

The preferred method of adding the zein solution to the previously coated high-potency sweetener is to add it in small amounts in time spaced increments while continuously mixing. When adding the solution this way, it is desirable to allow the mix to become homogeneous before the next addition of solution. In following this preferred method, the solution is allowed to be absorbed slowly into the mixture without producing pools of solution which can result in large clay-like lumps in the mixture.

It has been found that one method of determining when there is sufficient solution added is to monitor the power demand for the mixer. In particular, the power demand increases dramatically as the mix goes from the desired damp mix stage to a dough-like stage. This is believed to be due to the fact that, in the desired damp mix stage, the mix is crumbly, i.e. easily separable; whereas when the mix moves into the clay-like stage, the mix become more cohesive. As a result, the power demand on the mixer can be monitored and the solution addition stopped just as the power demand begins a sharp rise.

It is also possible to determine the proper amount of solution to add by visually monitoring the condition of the damp mix. The characteristics mentioned above, namely dust-free, non-flowable, and crumbly, are relatively easy to observe and contrast with the cohesiveness, and flowability of the dough-like stage.

Naturally, once the optimum amount of solution is determined for a particular zein content level and a particular weight ratio of zein to high-potency sweetener, that optimum amount of solution will be reproducible.

In the preferred embodiment represented in FIG. 1, the zein solution is added so as to comprise between about 30 and about 70 percent by weight of the damp mix, more preferably between about 40 and about 60 percent, and most preferably about 50 percent.

In selecting the relative proportion of zein to high-potency sweetener in the final product, some factors to consider are the specific high-potency sweetener selected and the release profile or shelf-stability which is being sought for the twice-coated sweetener in the particular chewing gum. Generally, using more zein will result in better shelf-stability of the high-potency sweetener hen the gum is chewed.

Naturally, the amount of zein should be kept below the level at which it would adversely affect the texture of the chewing gum. Preferably, the zein will comprise between about 5 and about 25 by weight percent of the coated high-potency sweetener, i.e. percent by combined weight of the high-potency sweetener and the zein. In the most preferred embodiment, the zein is added to between about 8 and about 20 percent by weight of the agglomerated high-potency sweetener, even more preferably between about 10 and about 16 percent.

After the last of the solution is added, the mixture is continuously mixed for a time sufficient to produce for a homogenous mass. In particular, the solvated and unsolvated high-potency sweetener, the solvated and unsolvated zein, and any free water should all be evenly dispersed in the mix. The optimum time of mixing can be determined visually.

The type of mixing affected on the mix is believed to be important to the present invention. In particular, it is believed that a compressive type mixing is important in order to push the solvated zein and the particles of high-potency sweetener together into clusters. This is contrasted with a high shear type mixing which would act to separate the components of the damp mix. Accordingly, the preferred type of mixer is a planetary mixer or other type mixer that would give similarly compressive type mixing.

After the final mixing, the damp mix is dried. Preferably, substantially all of the water will be removed from the mix. The drying is preferably accomplished by taking the damp mix out of the mixer bowl and spreading it on drying trays. It been found preferable to line the drying trays with paper to facilitate removal of the dried product. In the most preferred embodiment, the damp mix is spread on trays at a depth of about 1 to 2 cm.

Preferably, the drying is accomplished by placing the trays in a drying oven at a temperature and for a time sufficient to drive off substantially all of the water. Naturally, the temperature and time for drying will depend on the amount of water used in the mixture used as well as factors such as the thermal or moisture stability of the high-potency sweetener. Accordingly, it may be desirable to allow the damp mix to dry at ambient conditions. In the most preferred embodiment, the aspartame coated with 13 weight percent zein is dried at about 170° F. for 16 to 20 hours.

After drying in this first preferred embodiment, the coated aspartame has been found to have a water content of between about 2 and 5 percent by weight of the total. The acceptable level of water left in the agglomerated high-potency sweetener particles may be higher or lower than this amount and will depend on the nature of the high-potency sweetener. Naturally, if the high-potency sweetener is subject to deterioration in the presence of water, it is important to drive off as much of the water as possible. For example, aspartame is known to be less stable in the presence of moisture. Accordingly, in the preferred embodiment using aspartame as the high-potency sweetener, it is desirable to drive off as much of the water as feasible.

After drying, the mix is generally characterized as being in the form of hard, dry lumps of various shapes and sizes. At this point, the dry mix is ready to be treated to produce the desired range of particle sizes. This can be accomplished in various ways. Most preferably, the dried mix is fed into a grinder which comminutes the mix into smaller particles. Other devices such as a roller mill can also be used to comminute the dried mix. The grinder or other device is preferably equipped with a screen which will pass the desired particle size range. If desired, other techniques such as a second screen or a cyclone separator can be used to ensure a minimum particle size as well as a maximum particle size. Preferably, a screen with 0.04 inch holes is used to produce the twice-coated aspartame particles of this first preferred embodiment.

In this first preferred embodiment, only the maximum particle size is controlled. That is, the smaller particles are not held back. As a result, there may be small unbonded crystals in addition to larger clusters of coated particles. This result is believed to be preferable for particular high-potency sweeteners in certain gum formulations. For example, in this first preferred embodiment, this is believed to produce the effect of allowing some smaller and/or unbonded particles of the aspartame to be released more quickly when the gum is chewed than the aspartame which is bound in the clusters. As a result, the release profile is such that the consumer experiences sufficient sweetness initially and also subsequently.

In alternative embodiments, it may be desirable to control the maximum and the minimum particle size to produce a narrower range of particle sizes. This may be desired when it is intended for all of the high-potency sweetener to have a more uniform delayed release.

At this point, the above-described zein coated high-potency sweetener is ready to be incorporated into a chewing gum. The remainder of the chewing gum ingredients are seen to be noncritical to the present invention. That is, the zein coated particles of high-potency sweetener can be incorporated into conventional chewing gum formulations in a conventional manner. Naturally, the preferred chewing gum formulation is a sugarless chewing gum. However, the high-potency sweeteners may also be used in a sugar chewing gum to intensify and/or extend the sweetness thereof. The zein coated high-potency sweetener may be used in either regular chewing gum or bubble gum.

In general, a chewing gum composition typically comprises a water soluble bulk portion and a water insoluble chewable gum base portion and, typically water insoluble flavoring agents. The water soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component such as calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water soluble portion of the chewing gum may further comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

As mentioned above, the coated high-potency sweeteners of the present invention will most likely be used in sugarless gum formulations. However, formulations containing sugar are also within the scope of the invention. Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination.

The zein coated high-potency sweeteners of the present invention can also be used in combination with other sugarless sweeteners. Generally sugarless sweeteners include components with sweetening characteristics but are devoid of the commonly known sugars and comprise but are not limited to sugar alcohols such as sorbitol, mannitol, xylitol, hydrogenated starch hydrolysates, maltitol, and the like, alone or in any combination.

Depending on the particular sweetness release profile and shelf-stability needed, the zein coated high-potency sweeteners of the present invention can also be used in combination with uncoated high-potency sweeteners or with high-potency sweeteners coated with other materials and by other techniques.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be combined in any sensorally acceptable blend. All such flavors and flavor blends are contemplated by the present invention.

Preferably, the flavoring agent used in the chewing gum of the present invention will include an aldehyde containing flavor component. Examples of such flavoring agents include, but are not limited to, cinnamon oil which includes cinamaldehyde, cherry flavor which includes benzaldehyde, lemon flavor which includes citral and citronellal, vanilla flavor which includes vanillin and ethyl vanillin, fruit flavor which includes acetaldehyde, orange flavor which includes undecanol and dodecenal. Other flavors which include aldehyde containing components can be found on pages 325–328 of the book *Flavor Technology: Profiles, Products, Applications*, authored by Henry B. Heath, M.B.E., B. Pharm. and published in 1978 by The AVI Publishing Co., Inc. of Westport Conn., which pages are incorporated herein by reference. Most preferably, the flavor used in the gum is a cinnamon flavor, which will include cinamaldehyde.

A specific advantage of the present invention is the fact that the coating of zein has been observed to enhance the stability of dipeptide sweeteners in the presence of these aldehyde containing flavor components. As mentioned above, it has been known in the past that aspartame is degraded with a resultant loss in sweetness when used unprotected and in the presence of an aldehyde containing flavor component.

Optional ingredients such as colors, emulsifiers and pharmaceutical agents may be added to the chewing gum.

In general, chewing gum is manufacture by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent. The twice coated sweetener of the present invention is preferably added after the final portion of bulking agent and flavor have been added.

The entire mixing procedure typically takes from five to fifteen minutes, but longer mixing times may some-times be required. Those skilled in the art will recognize that many variations of the above described procedure may be followed.

Figure 2:
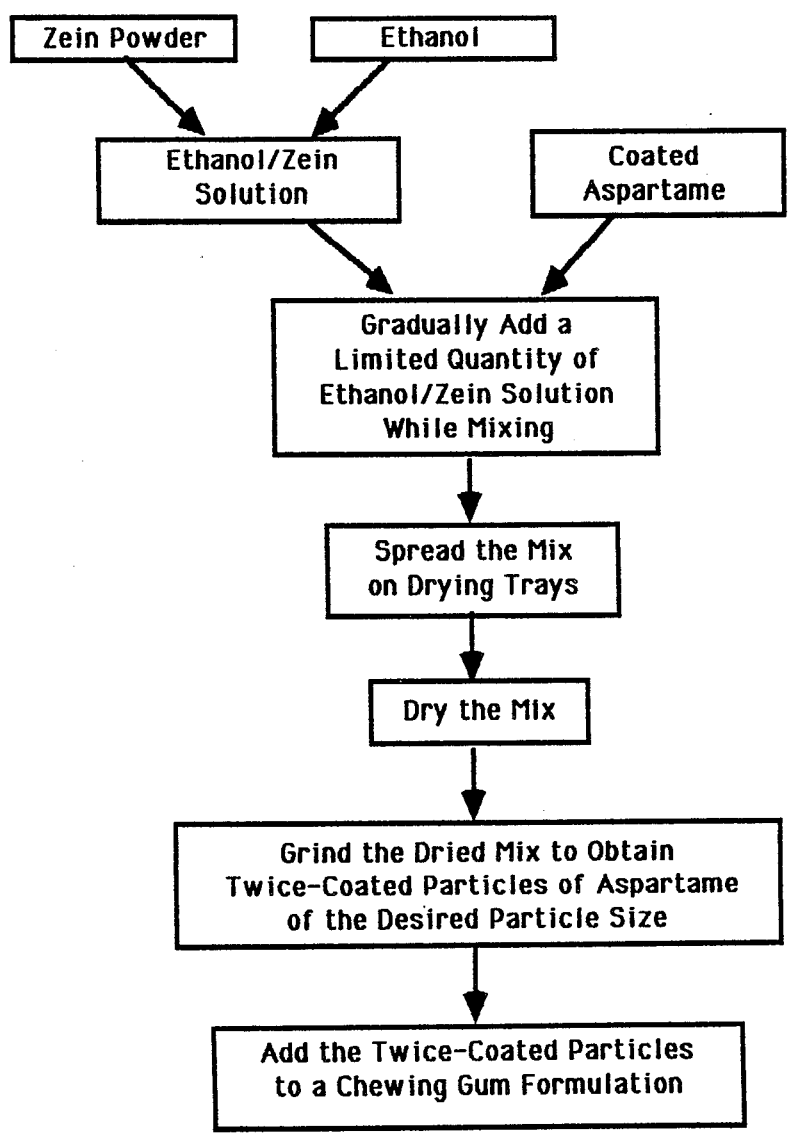
FIG. 2 is a schematic representation of a second preferred embodiment of the present invention.

Referring now to FIG. 2, a second preferred embodiment of the present invention is depicted. This embodiment is similar in all respects to that depicted in FIG. 1 with the exception that the zein is dissolved in ethanol rather than high pH water. In particular, the zein powder is dissolved in 95% pure food grade ethanol, such as that available from the AAPER Alcohol and Chemical Co. under the designation "Ethyl Alcohol solution will be between about 10 and about 50 percent by weight zein, more preferably between about 20 and about 45, and most preferably about 35. The zein content of this ethanol solution may be varied depending on the amount of zein which is desired to be present in the final twice-coated particles of high-potency sweetener.

The amount of ethanol/zein solution which is added to the coated particles is preferably between about 25 and about 75 percent by weight of the damp mix, more preferably between about 30 and about 60, and most preferably about 42. As in the first preferred embodiment, the amount of zein solution is limited so as to produce a damp, dust-free, non-flowable, non-extrudable, crumbly mixture.

This damp mix is spread on trays as above and dried to remove substantially all of the ethanol. Naturally, the temperature and drying times are lower when ethanol is used. In particular, the drying temperature is set at about 150° and the mix is dried for about 12 hours.

Figure 3:
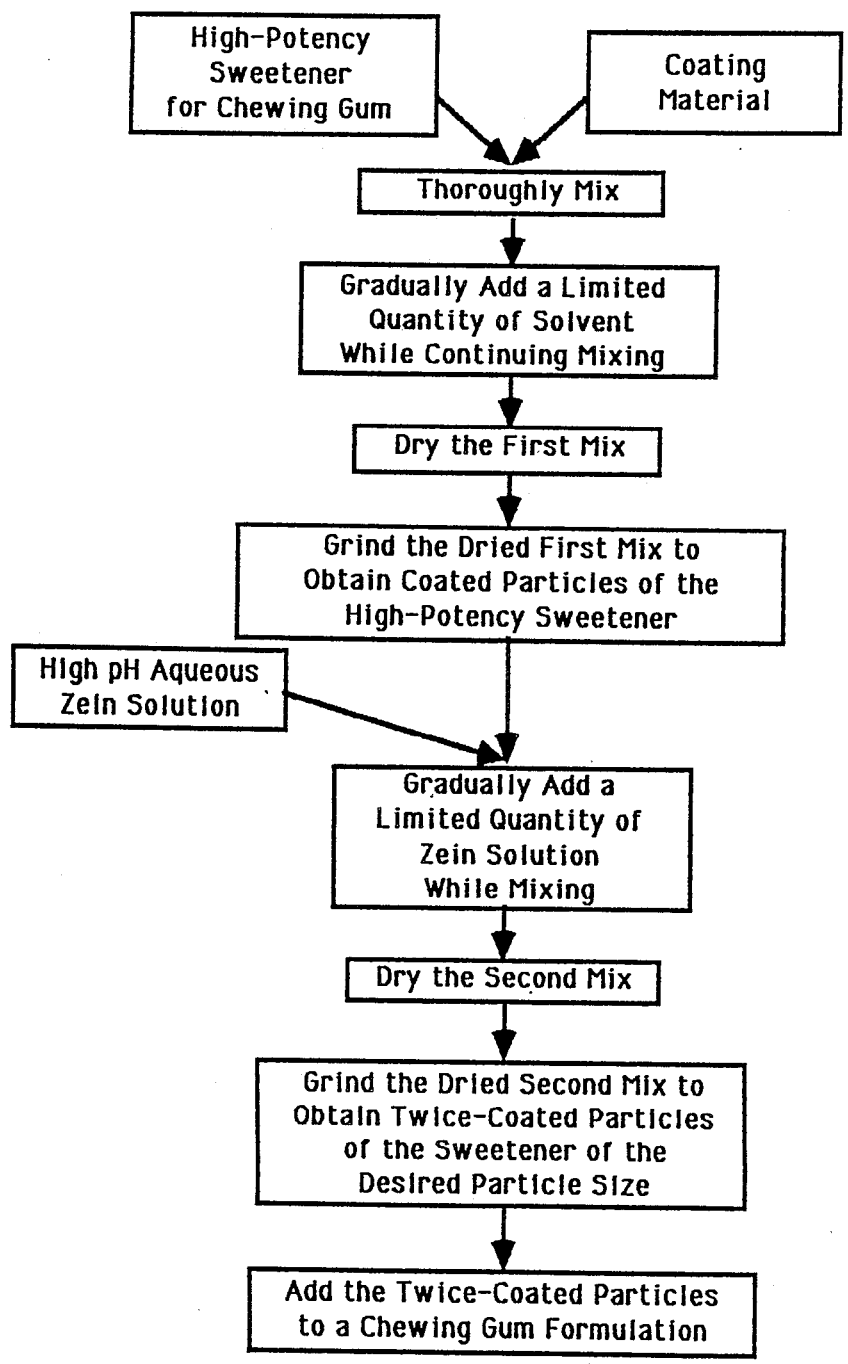
FIG. 3 is a schematic representation of a third preferred embodiment of the present invention.

Referring now to FIG. 3, a third preferred embodiment of the present invention is depicted. In this third preferred embodiment, before being coated with zein, the high-potency sweetener is first agglomerated according to the process disclosed in U.S. patent application Ser. No. 06/921,754, from which the present application is a continuation-in-part, and which application has been incorporated by reference herein. Most preferably, the high-potency sweetener is aspartame and is agglomerated with a modified cellulose compound, such as hydroxypropyl methylcellulose, in accordance with the most preferred embodiment disclosed in the parent application.

In particular, the aspartame is agglomerated with about 15 weight percent hydroxypropyl methylcellulose. This is accomplished by dry blending about 85 weight percent aspartame and about 15 weight percent hydroxypropyl methylcellulose in a mixing bowl of a hobart mixer as described above. Increments of water are gradually added to the mix until the mix comprises about 25 weight percent water. This damp mix is then spread on drying trays and dried at about 170° F. for 12 to 14 hours. The water content of the dried mix is about 2 to 3 weight percent. The dried mix is then removed from the trays and ground in a fitzmill grinder with a 0.04" screen.

The coated aspartame thus produced is then treated the same as described above with a zein solution, preferably the high pH aqueous zein solution described above. That is, a quantity is placed in a mixing bowl and a solution of zein is added incrementally while the mixer is activated. The zein content and the pH of the zein solution and the amount of the solution added to the mixer are preferably the same as that described above. The mixture is spread on drying trays and dried at the same temperature for the same amount of time. The dried mixture is then ground as described above to thereby produce twice-coated particles of aspartame.

Figure 5:
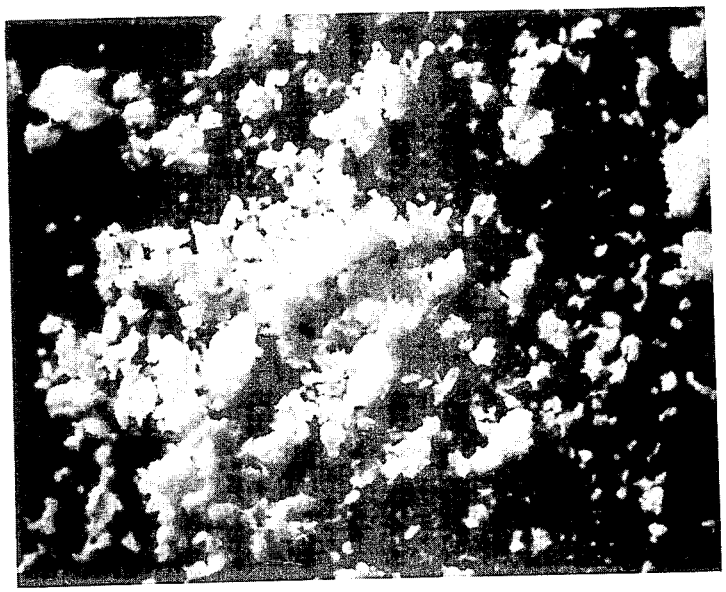
FIG. 5 is a photomicrograph of twice-coated aspartame crystals according to the third preferred method of the present invention represented in FIG. 3.

FIG. 5 is a photomicrograph of the product of this other preferred embodiment, i.e. the embodiment represented in FIG. 3. In particular, the aspartame particles were first coated with about 15 weight percent hydroxypropyl methylcellulose. Subsequently, about 66 parts by weight of the particles were mixed with about 34 parts by weight of a 16 weight percent zein solution. Accordingly, the wet mix was about 56 weight percent aspartame, about 10 weight percent hydoxypropyl methylcellulose, about 5 percent zein, and about 29 percent water. This mix was dried to about 5 weight percent water. As a result, the dried particles were about 77 weight percent aspartame, about 14 weight percent hydroxypropyl methylcellulose, about 7 weight percent zein, and about 2 weight percent water.

It was surprising to note that the twice-coated aspartame product of this other preferred embodiment is particularly well suited for use in cinnamon flavored chewing gum. As mentioned above, aspartame has been known to be relatively unstable when used in cinnamon flavored chewing gums. This is believed to be a result of unfavorable reactions between the aspartame molecules and the aldehyde groups present in cinnamon oils. The inventor had observed that aspartame agglomerated with a modified cellulose compound in accordance with the parent application were not particularly stable when used in cinnamon flavored gum. In addition, the inventor observed that uncoated aspartame particles when coated with an aqueous solution of zein, i.e. only zein, likewise did not exhibit the stability necessary for use in cinnamon gums. However, it has been found that when the aspartame is first treated with the modified cellulose compound, and then with the zein as described above, the aspartame did exhibit significantly improved stability in a cinnamon flavored chewing gum.

EXAMPLES

The following examples of the invention and comparative examples are provided by way of explanation and illustration. Examples 1 and 2 were produced with aspartame as the high-potency sweetener. Comparative example 3 was produced with only a coating of modified cellulose. Comparative example 4 was produced with only a coating of an aqeuous zein solution. Comparative example 5 was a chewing gum made with uncoated aspartame.

Example 1 was carried out in accordance with the third preferred embodiment shown in FIG. 3. In particular, 7711 g. of unmilled aspartame from the G.D. Searle Company was placed in the 40 qt. bowl of a Hobart mixer. 1361 g. of Methocel E4M from the Dow Chemical Co. was also added to the bowl. These two powders were dry blended at the low speed setting on the mixer for approximately 15 minutes. A total of approximately 4880 ml of water was added to this mix. This was accomplished by adding between 200 to 1000 ml of water every 3 to 5 minutes with the mixer running. The damp mix that resulted was dustless and coalesced when squeezed. The damp mix was mixed for about 5 minutes after the last water addition to insure complete interdispersion. The damp mix was transferred to stainless steel trays and spread to a depth of approximately 2 cm. At this point, the material was approximately 34.6 weight percent water, 9.8 weight percent HPMC and 55.6 weight percent aspartame. The trays were placed in an oven and heated to 170° for 12 to 14 hours. After drying the mix was ground in a Fitzmill at high speed while using a 0.04 inch screen. The water content of this intermediate methocel coated aspartame was between 2 and 3 weight percent.

A 6,804 g. quantity of the methocel product prepared above was then treated with a zein solution prepared by mixing 6,216 g. of water, 1273 g. of zein, and 175 ml. of a 4M sodium hydroxide solution. The methocel coated aspartame product was placed in a 40 quart bowl of a Hobart mixer. The mixer was activated on the low speed and 3551 g. of the zein solution was added in increments between 300 and 500 grams every 3 to 5 minutes with the mixer running. The damp mix that resulted was dustless and coalesced when squeezed. The damp mix was mixed for about 5 minutes after the last zein solution addition to insure complete interdispersion. The damp mix was transferred to stainless steel trays and spread to a depth of approximately 1 to 2 cm. At this point, the material was about 29 weight percent water, 66 weight percent methocel coated aspartame, and about 5 weight percent zein.

The loaded trays were placed in a conventional oven and heated to about 170° F. for 18 to 20 hours. After drying, the mix was ground in a Fitzmill at high speed using a 0.04 inch screen. The water content of the final product was 4.4 weight percent. The calculated aspartame content was about 77.8 weight percent, while the value from chemical analysis was about 78.3 weight percent. The product of this example is shown in FIG. 5.

Example 2 was carried out the same as Example 1 with the exception that instead of an aqueous solution of zein, an ethanol solution with a different zein content was used. In particular, the ethanol/zein solution contained about 36.5 weight percent zein. Methocel coated aspartame was prepared by the same process described in Example 1. An 11,213 g. quantity of the methocel coated aspartame product was then treated with a zein solution prepared by mixing 3,140 g. of zein and 5,460 g. of food grade ethanol. The methocel coated aspartame was placed in the bowl of a 40 quart Hobart mixer. The mixer was activated on the low speed, and 8,600 g. of the ethanol/zein solution was added in increments of between 300 and 500 ml. every 3 to 5 minutes with the mixer running. The damp mix that resulted was dustless and coalesced when squeezed. The damp mix was mixed for about 5 minutes after the last zein solution to insure complete interdispersion.

The damp mix was transferred to stainless steel trays and spread to a depth of approximately 1 to 2 cm. At this point, the material was about 58 weight percent methocel coated aspartame, 15 weight percent zein, and about 27 weight percent ethanol. The loaded trays were placed in a conventional oven and heated to about 160° F. for about 18 to 20 hours, with the exhaust being vented to the outside.

After drying, the mix was ground in a Fitzmill at high speed using a 0.04″ screen. The water content of the final product was about 2.5 weight percent. The calculated aspartame content was about 65.4 weight percent, while the value obtained from chemical analysis was about 65.9 weight percent aspartame.

Comparative example 3 was carried out the same as example 1, except that the process was stopped after grinding of the methocel coated aspartame, i.e. a coating of zein was not applied.

Comparative example 4 was carried out according to the first preferred embodiment of the present invention depicted in FIG. 1, with the exception that the aspartame used to mix with the aqueous zein solution was not coated beforehand. First, 5.65 g. of sodium hydroxide was added to about 950 g. of water to thereby produce water with a pH in the range of 11.6 to 11.9. Next, about 204 g. of zein powder obtained from the Freeman Co., which zein had a moisture content of 4.13 weight percent was added to 950 g. of water. The zein solution thus had a zein content of about 15.4 percent.

About 50 g. of unmilled aspartame from the NUTRASWEET Company was placed in a shallow pan and granulated with 50.5 g. of the above-described zein solution. This was accomplished by adding aliquots of between 10 and 20 g. of the zein solution every 3 to 5 minutes with hand mixing to form a granulation. The damp mix that resulted was dustless and coalesced when squeezed. The damp mix was transferred to stainless steel trays and spread to a depth of approximately 1 to 2 cm. At this point, the material was approximately 44 weight percent water, 8 weight percent zein and 48 weight percent aspartame. The trays were placed in an oven and heated to 170° for 18 to 20 hours. After drying, the mix was ground in a Fitzmill at high speed while using a 0.4 inch screen. The water content of the final product was between 2 and 5 weight percent.

Comparative example 5 consisted of using uncoated aspartame, i.e. neat.

The coated particles prepared in Examples 1,2,3, 4, and 5 were tested in a sugarless cinnamon flavored chewing gum with the following formulation:

Gum base 25.1%
Sorbitol 45.3%
Xylitol 15.0%
Mannitol 4.0%
Glycerin 9.0%
Cinnamon Flavor 1.6%

The gum base used was a conventional chewing gum base. The sorbitol was obtained from the Roquette Corporation under the designation "Neosorb P60." The mannitol was also obtained from the Roquette Corporation under the designation "Mannitol-F." The Xylitol was obtained from Finnsugar Biochemical, Inc. under the designation "Xylitol CM" (crystalline milled). The cinnamon flavor is a blend of natural and artificial flavors that contain about 75 weight percent cinamaldehyde.

Each of these gum formulations was sealed in a hermetic pouch and stored at 85° F. and removed after 7 and 14 days for analysis. The following table shows the amount of coated high-potency sweetener added, analysis of sweetener amount in the chewing gum after making, and its stability in the gum formulation as shown by the amount remaining after 7 and 14 days.

TABLE

| Example | % Added | % Day 0 | % Day 7 | % Day 14 |
| --- | --- | --- | --- | --- |
| 1 | 0.428 | 0.22 | 0.22 | 0.21 |
| 2 | 0.448 | 0.25 | 0.22 | 0.21 |
| 3 | 0.352 | 0.21 | 0.08 | 0.10 |
| 4 | 0.367 | 0.25 | 0.08 | 0.04 |
| 5 | 0.300 | 0.22 | 0.09 | 0.04 |

As can be seen from the results in Table 2, the products of examples 1 and 2, i.e. the twice-coated particles of aspartame, were significantly more stable in the cinnamon flavored chewing gum. In particular, more of the aspartame was present in the chewing gum made with the aspartame product of examples 1 and 2 after 7 and 14 days of accelerated aging than was present in the other examples. This is in contrast, with the low stability shown in Examples 3, 4, and 5. It was a somewhat surprising result to see that, although aspartame coated with either methocel or zein alone was not significantly more stable than untreated aspartame in a cinnamon gum, the combination of a first coating followed by the zein coated did improve the stability of the aspartame.

In summary, a relatively simple and inexpensive process has been described for producing delayed release high-potency sweeteners for chewing gum. Although specific embodiments and examples have been described herein, it should be born in mind that these have been provided by way of explanation and illustration and that the present invention is not limited thereby. Certainly modifications which are within the ordinary skill in the art to make are considered to lie within the scope of the invention as defined by the following claims, including all equivalents.

I claim:

1. A method for producing chewing gum with a twice-coated high-potency sweetener comprising the following steps:
   measuring a quantity of high-potency sweetener particles coated with a material selected from the group consisting of modified cellulose, gums, shellac, maltodextrins, gelatins, starches, and lactose, as well as mixtures thereof;
   preparing a solution of zein having a zein content between about 1 and about 50 percent by weight;
   slowly adding said zein solution to said coated high-potency sweetener particles while mixing until a coated, dust free, non-flowing, and crumbly damp mix is obtained;
   drying the zein coated damp mix; and
   particle sizing said dried mix to thereby obtain twice-coated particles of the high-potency sweetener within a particle size range suitable for use in chewing gum; and
   adding a quantity of said twice-coated particles to a chewing gum formulation.

2. The method of claim 1 wherein the high-potency sweetener is selected from the group consisting of aspartame, alitame, salts of acesulfame, sucralose, saccharin and its salts, cyclamic acid and its salts, thaumatin, and monellin, as well as combinations thereof.

3. The method of claim 1 wherein the high-potency sweetener is a dipeptide sweetener selected from the group consisting of aspartame, alitame and combinations thereof.

4. The method of claim 1 wherein the high-potency sweetener is mixed with a bulking agent.

5. The method of claim 1 wherein the chewing gum comprises an aldehyde containing flavor component.

6. The method of claim 5 wherein the aldehyde containing flavor component is selected from the group consisting of cinamaldehyde, benzaldehyde, citral, citronellal, vanillin, ethyl vanillin, acetaldehyde, undecanal, and dodecanal, as well as combinations thereof.

7. The method of claim 1 wherein said zein solution comprises zein dissolved in water having a pH of between about 11.5 and about 12.1.

8. The method of claim 7 wherein the high-potency sweetener is selected from the group consisting of aspartame, alitame, salts of acesulfame, sucralose, saccharin and its salts, cyclamic acid and its salts, thaumatin, and monellin, as well as combinations thereof.

9. The method of claim 7 wherein the high-potency sweetener is a dipeptide sweetener selected from the group consisting of aspartame, alitame and combinations thereof.

10. The method of claim 7 wherein the aqueous solution of zein has a zein content between about 5 and about 20 percent by weight.

11. The method of claim 7 wherein the aqueous solution of zein has a zein content between about 13 and about 18 percent by weight.

12. The method of claim 7 wherein the aqueous solution of zein has a zein content of about 16 percent by weight.

13. The method of claim 7 wherein the aqueous solution of zein has a pH between about 11.6 and 11.9.

14. The method of claim 7 wherein the chewing gum comprises an aldehyde containing flavor component.

15. The method of claim 14 wherein the aldehyde containing flavor component is selected from the group consisting of cinamaldehyde, benzaldehyde, citral, citronellal, vanillin, ethyl vanillin, acetaldehyde, undecanal, and dodecanal, as well as combinations thereof.

16. The method of claim 1 wherein the zein solution comprises zein dissolved in an alcohol.

17. The method of claim 1 wherein the zein solution comprises zein dissolved in ethanol.

18. The method of claim 17 wherein the high-potency sweetener is selected from the group consisting of aspartame, alitame, salts of acesulfame, sucralose, saccharin and its salts, cyclamic acid and its salts, thaumatin, and monellin, as well as combinations thereof.

19. The method of claim 17 wherein the high-potency sweetener is a dipeptide sweetener selected from the group consisting of aspartame, alitame and combinations thereof.

20. The method of claim 17 wherein the ethanol solution of zein has a zein content between about 10 and about 50 percent by weight.

21. The method of claim 17 wherein the ethanol solution of zein has a zein content between about 20 and about 45 percent by weight.

22. The method of claim 17 wherein the chewing gum comprises and aldehyde containing flavor component.

23. The method of claim 22 wherein the aldehyde containing flavor component is selected from the group consisting of cinamaldehyde, benzalehyde, citral, citronellal, vanillin, ethyl vanillin, acetaldehyde, undecanal, and dodecanal, as well as combinations thereof.

24. A method for producing chewing gum with a twice-coated high-potency sweetener comprising the following steps:
   mixing a quantity of a high-potency sweetener with a quantity of a first coating material selected from the group consisting of modified cellulose, gums, shellac, maltodextrins, gelatins, starches, and lactose, as well as mixtures thereof together with a limited quantity of solvent for the first coating material to produce a damp mix, the damp mix being characterized as being dust free, non-flowing, and crumbly;
   drying said damp mix;
   particle sizing said dried mix to thereby obtain particles of the high-potency sweetener coated with the first coating material;
   preparing a solution of zein having a zein content between about 1 and about 50 percent by weight;
   slowly adding said zein solution to said coated high-potency sweetener particles while mixing until a coated, dust free, non-flowing, and crumbly damp mix is obtained;

drying the zein coated damp mix; and particle sizing said dried mix to thereby obtain twice-coated particles of the high-potency sweetener within a particle size range suitable for use in chewing gum; and adding a quantity of said coated particles to a chewing gum formulation.

25. The method of claim 24 wherein the high-potency sweetener is selected from the group consisting of aspartame, alitame, salts of acesulfame, sucralose, saccharin and its salts, cyclamic acid and its salts, thaumatin, and monellin, as well as combinations thereof.

26. The method of claim 24 wherein the high-potency sweetener is a dipeptide sweetener selected from the group consisting of aspartame, alitame and combinations thereof.

27. The method of claim 24 wherein the high-potency sweetener is mixed with a bulking agent.

28. The method of claim 24 wherein the chewing gum comprises an aldehyde containing flavor component.

29. The method of claim 28 wherein the aldehyde containing flavor component is selected from the group consisting of cinamaldehyde, benzaldehyde, citral, citronellal, vanillin, ethyl vanillin, acetaldehyde, undecanal, and dodecanal, as well as combinations thereof.

30. The method of claim 24 wherein said zein solution comprises zein dissolved in water having a pH of between about 11.5 and about 12.1.

31. The method of claim 30 wherein the high-potency sweetener is selected from the group consisting of aspartame, alitame, salts of acesulfame, sucralose, saccharin and its salts, cyclamic acid and its salts, thaumatin, and monellin, as well as combinations thereof.

32. The method of claim 30 wherein the high-potency sweetener is a dipeptide sweetener selected from the group consisting of aspartame, alitame and combinations thereof.

33. The method of claim 30 wherein the aqueous solution of zein has a zein content between about 5 and about 20 percent by weight.

34. The method of claim 30 wherein the aqueous solution of zein has a zein content between about 13 and about 18 percent by weight.

35. The method of claim 30 wherein the aqueous solution of zein has a zein content of about 16 percent by weight.

36. The method of claim 30 wherein the aqueous solution of zein has a pH between about 11.6 and 11.9.

37. The method of claim 24 wherein the zein solution comprises zein dissolved in an alcohol.

38. The method of claim 37 wherein the chewing gum comprises an aldehyde containing flavor component.

39. The method of claim 38 wherein the aldehyde containing flavor component is selected from the group consisting of cinamaldehyde, benzaldehyde, citral, citronellal, vanillin, ethyl vanillin, acetaldehyde, undecanal, and dodecanal, as well as combinations thereof.

40. The method of claim 24 wherein the zein solution comprises zein dissolved in ethanol.

41. The method of claim 40 wherein the high-potency sweetener is selected from the group consisting of aspartame, alitame, salts of acesulfame, sucralose, saccharin and its salts, cyclamic acid and its salts, thaumatin, and monellin, as well as combinations thereof.

42. The method of claim 40 wherein the high-potency sweetener is a dipeptide sweetener selected from the group consisting of aspartame, alitame and combinations thereof.

43. The method of claim 40 wherein the ethanol solution of zein has a zein content between about 10 and about 50 percent by weight.

44. The method of claim 40 wherein the ethanol solution of zein has a zein content between about 20 and about 45 percent by weight.

45. The method of claim 40 wherein the chewing gum comprises an aldehyde containing flavor component.

46. The method of claim 45 wherein the aldehyde containing flavor component is selected from the group consisting of cinamaldehyde, benzaldehyde, citral, citronellal, vanillin, ethyl vanillin, acetaldehyde, undecanal, and dodecanal, as well as combinations thereof.

47. A chewing gum made according to the method of claim 10.

48. A chewing gum made according to the method of claim 11.

49. A chewing gum made according to the method of claim 12.

50. A chewing gum made according to the method of claim 20.

51. A chewing gum made according to the method of claim 21.

52. A chewing gum made according to the method of claim 33.

53. A chewing gum made according to the method of claim 34.

54. A chewing gum made according to the method of claim 35.

55. A chewing gum made according to the method of claim 44.

* * * * *

UNITED STATES PATENT AND TRADEMARK OFFICE
CERTIFICATE OF CORRECTION

PATENT NO. : 4,863,745
DATED : September 5, 1989
INVENTOR(S) : Steven E. Zibell

It is certified that error appears in the above-identified patent and that said Letters Patent is hereby corrected as shown below:

In column 6, line 63, please delete "become" and substitute therefor --becomes--.

In column 7, line 22, please delete "hen" and substitute therefor --when--.

In column 11, line 11, after "Alcohol" please insert -- - U.S.P. 95%, 190 Proof." Preferably, this ethanol/zein--.

IN THE CLAIMS

In claim 22, column 16, line 41, please delete "and" and substitute therefor --an--.

Signed and Sealed this

Twenty-third Day of June, 1992

*Attest:*

DOUGLAS B. COMER

*Attesting Officer*  Acting Commissioner of Patents and Trademarks